United States Patent
Lenz et al.

(10) Patent No.: US 10,572,332 B1
(45) Date of Patent: Feb. 25, 2020

(54) FAILURE PREDICTION SYSTEM

(71) Applicant: Wells Fargo Bank, N.A., San Francisco, CA (US)

(72) Inventors: Jimmie Harold Lenz, Isle of Palms, SC (US); James Frances Horn, III, Alton, IL (US); Amy Marie Otis, University City, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 44 days.

(21) Appl. No.: 15/797,921

(22) Filed: Oct. 30, 2017

(51) Int. Cl.
G06F 11/07 (2006.01)
G06F 17/27 (2006.01)
G06N 7/00 (2006.01)

(52) U.S. Cl.
CPC ........ *G06F 11/079* (2013.01); *G06F 11/0751* (2013.01); *G06F 17/278* (2013.01); *G06N 7/005* (2013.01)

(58) Field of Classification Search
CPC ............. G06F 11/0751; G06F 11/0769; G06F 11/0772; G06F 11/079; G06F 11/0793; G06F 11/302; G06F 11/3438
See application file for complete search history.

(56) References Cited

U.S. PATENT DOCUMENTS

| | | | | |
|---|---|---|---|---|
| 7,587,634 | B2* | 9/2009 | Imai | G06F 11/0709 714/26 |
| 8,166,351 | B2* | 4/2012 | Slutsman | G06F 11/079 714/25 |
| 8,612,372 | B2* | 12/2013 | Gotoh | G06N 5/025 706/16 |
| 9,348,721 | B2* | 5/2016 | Clifton | G06F 11/0727 |
| 2007/0074076 | A1* | 3/2007 | Imai | G06F 11/0709 714/26 |
| 2007/0266138 | A1* | 11/2007 | Spire | G06F 11/0709 709/223 |
| 2013/0191694 | A1* | 7/2013 | Gotoh | G06F 11/079 714/48 |
| 2015/0227405 | A1* | 8/2015 | Jan | G06F 11/079 714/37 |
| 2015/0324267 | A1* | 11/2015 | Clifton | G06F 11/0727 702/183 |

* cited by examiner

*Primary Examiner* — Nadeem Iqbal
(74) *Attorney, Agent, or Firm* — Schwegman Lundberg & Woessner, P.A.

(57) ABSTRACT

Among other things, embodiments of the present disclosure can help improve the functionality of failure prediction systems by identifying potential future failure events in a hardware or software component based on an analysis of current and historical information for the system. Embodiments of the present disclosure may use historical data associated with past technology failures to identify causal factors identified in current event data to help predict future outages and disruptions.

20 Claims, 4 Drawing Sheets

FAILURE PREDICTION SYSTEM

BACKGROUND

As the complexity of computer systems continues to grow, the potential for failures likewise increases. Interactions between the many hardware and software components that make up many computer systems are difficult to test fully, and failures of such components can result in costly downtime and delays. Embodiments of the present disclosure provides failure detection systems and methods that address these and other issues.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure can help improve the functionality of failure prediction systems by identifying potential future failure events in a hardware or software component based on an analysis of current and historical information for the system. Embodiments of the present disclosure may use historical data associated with past technology failures to identify causal factors identified in current event data to help predict future outages and disruptions.

Figure 1:
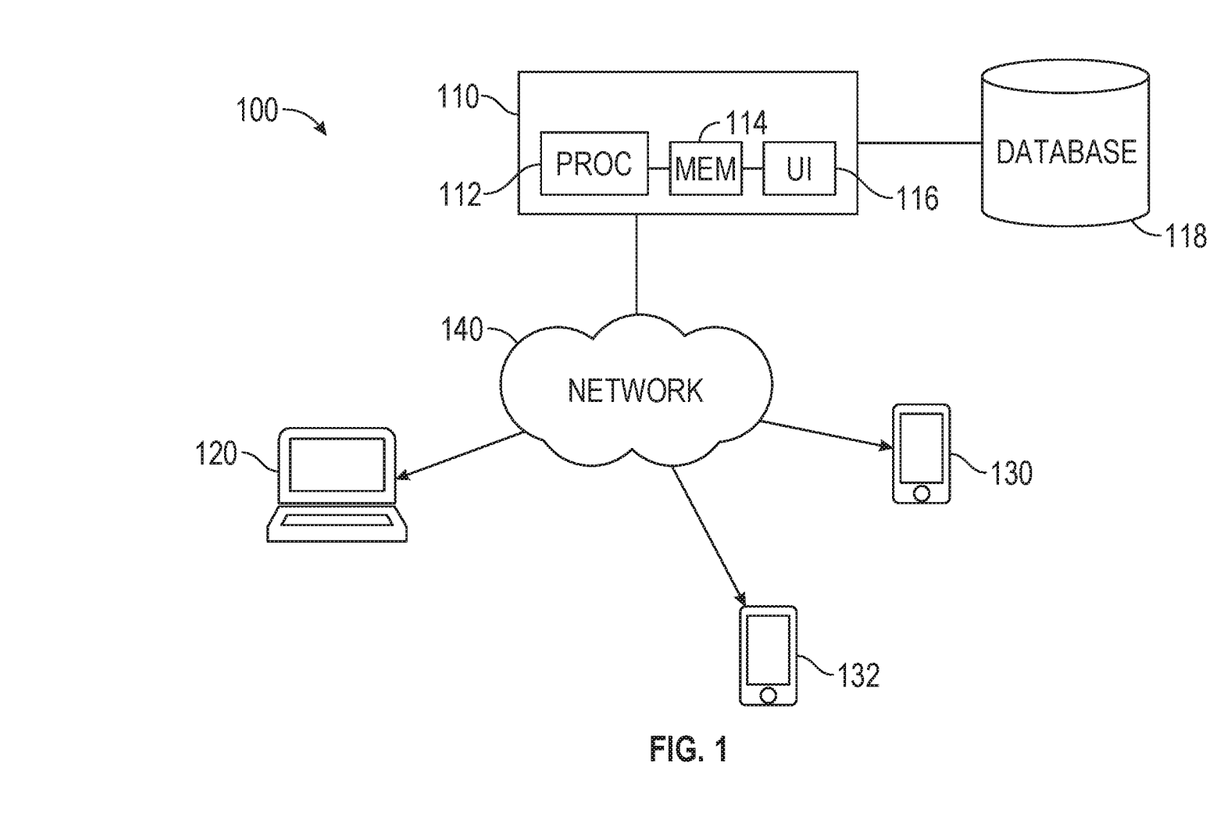
FIG. 1 illustrates a block diagram of an exemplary system according to various aspects of the disclosure.

FIG. 1 is a block diagram of system which may be used in conjunction with various embodiments. While FIG. 1 illustrates various components of a computer system, it is not intended to represent any particular architecture or manner of interconnecting the components. Other systems that have fewer or more components may also be used.

In FIG. 1, the system 100 includes a server computer system 110 comprising a processor 112, memory 114, and user interface 116. Computer system 110 may include any number of different processors, memory components, and user interface components, and may interact with any other desired systems and devices in conjunction with embodiments of the present disclosure.

The functionality of the computer system 110, including the steps of the methods described below (in whole or in part), may be implemented through the processor 112 executing computer-readable instructions stored in the memory 114 of the system 110. The memory 114 may store any computer-readable instructions and data, including software applications, applets, and embedded operating code. Portions of the functionality of the methods described herein may also be performed via software operating on one or more of the client computing devices 120, 122, 130.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116 that may include any number of input devices (not shown) to receive commands, data, and other suitable input. The user interface 116 may also include any number of output devices (not shown) to provides the user with data, notifications, and other information. Typical I/O devices may include mice, keyboards, modems, network interfaces, printers, scanners, video cameras and other devices.

The system 110 may communicate with one or more client computing devices 120, 122, 130 as well as other systems and devices in any desired manner, including via network 140. The system 110 and/or computing devices 120, 122, 130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 140 may include any electronic communications system or method.

Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The system 110 may include (e.g., in the memory 114) a database, and may communicate with any number of other databases, such as database 118. Any such databases may include a relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Figure 2A:
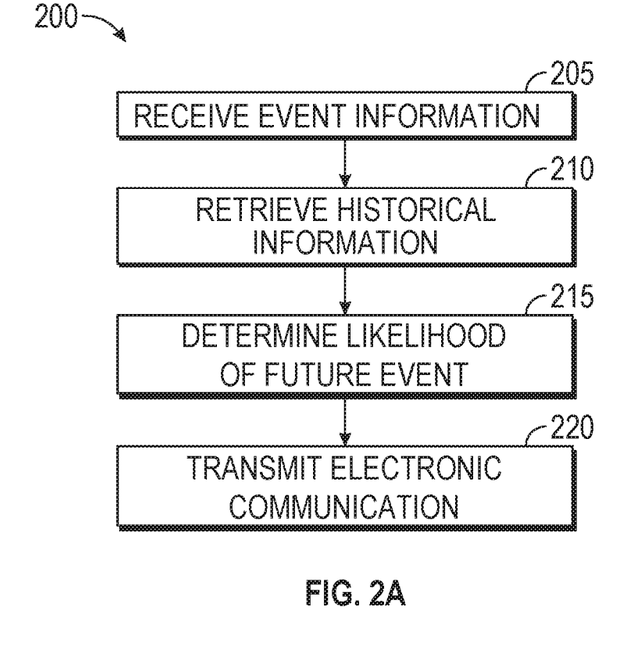
FIG. 2A is a flow diagram of an exemplary process according to various aspects of the disclosure.
Figure 3:
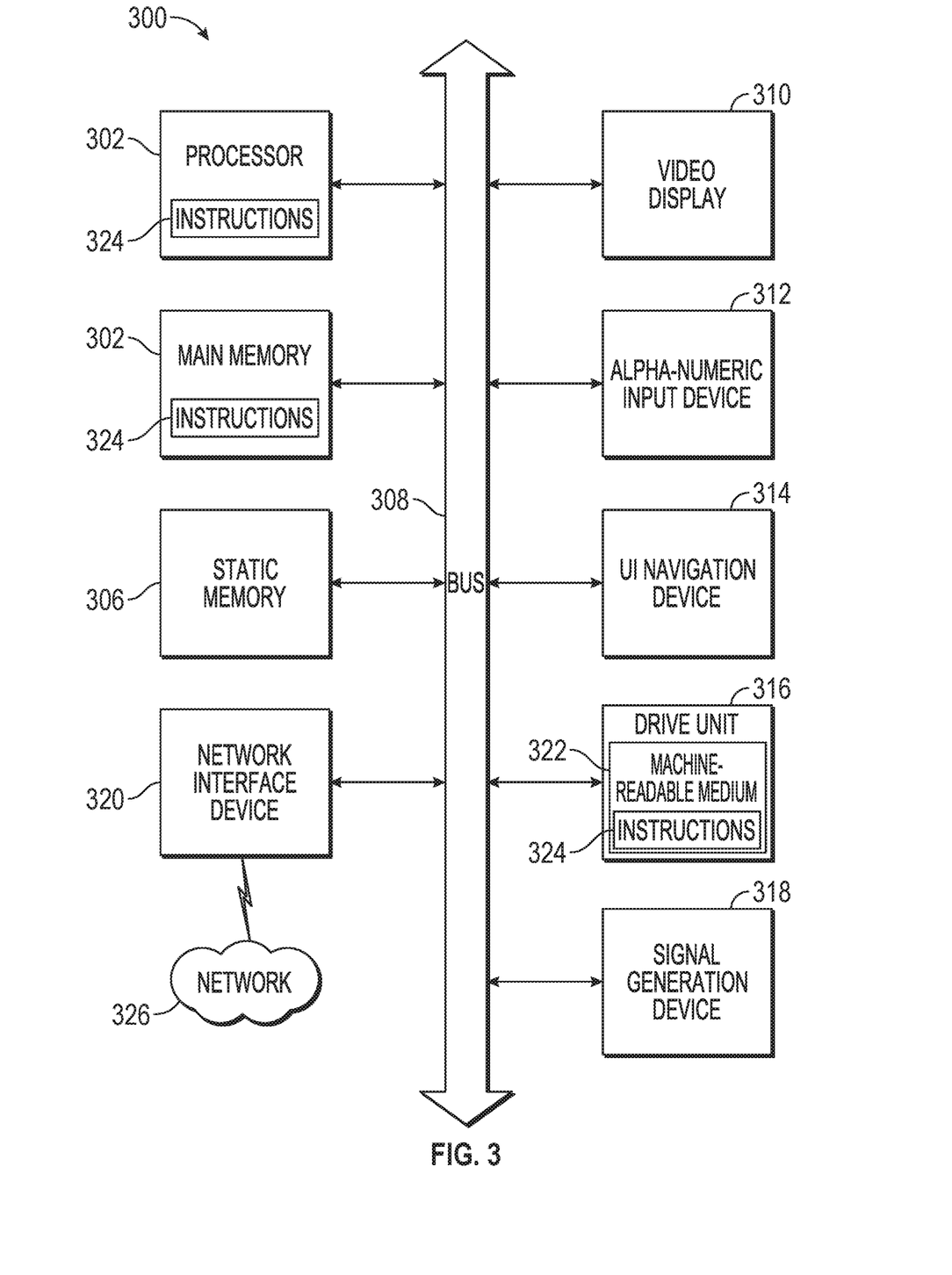
FIG. 3 is a block diagram of an exemplary machine according to various aspects of the disclosure.

FIG. 2A depicts an exemplary process according to various aspects of the present disclosure. In this example, method 200 includes receiving information regarding an event associated with a computing device (205), retrieving historical information associated with the computing device (210), determining, based on the information regarding the event and the historical information, the likelihood of a future event associated with the computing device occurring (215), and transmitting an electronic communication containing information regarding the future event (220). The steps of method 200 may be performed in whole or in part, may be performed in conjunction with some or all of the steps in other methods, and may be performed by any number of different systems, such as the systems described in FIGS. 1 and/or 3.

In the method 200 shown in FIG. 2A, the system (e.g., server computer system 110 in FIG. 1) receives information regarding an event associated with a computing device, such as devices 120, 130, or 132 in FIG. 1. Similarly, the event may be associated with a computing device, as well as hardware components and software components of a computing device. For example, the system may receive information regarding a software update applied to a computing device. Other events may include, for example, diagnostic information on the functionality of a hardware component (e.g., the processor, memory, or other components of the computing device), and diagnostic information on software operating on the computing device (e.g., the amount of memory used by a software application, the processor utilization of a software application, the amount of network traffic used by a software application, etc.).

Information on events may be received (205) in real-time or near-real-time as the event occurs. In other cases, the information on an event may be received before the event occurs (e.g., an anticipated software update to be applied in the future) or after the event occurs (e.g., an update log for a software patch). Information regarding events may be received in a variety of different ways and formats, such as via an electronic communication from the computing device. As used herein, an "electronic communication" may include any electronic form of communication, such as email, SMS or MMS text message, a data packet, a web page, and others. Information regarding an event may be in any suitable format, including text, audio, video, and images.

The system retrieves (210) historical information associated with the computing device to help predict or determine (215) a likelihood of a future event associated with the computing device occurring. Embodiments of the present disclosure may be used to predict a variety of different future events, such as an outage or disruption affecting the computing device. The prediction of the future event may be determined using any suitable scale or measure. For example, the likelihood of an event occurring may be determined with a rating on a scale of one (unlikely to occur) to ten (likely to occur). A probability associated with the event may also be determined, as well as an expected time frame for the event occurring. For example, the system may determine there is a 70% probability of a hardware failure occurring within the next five days.

In some embodiments, the system may predict a future event based on a comparison of the information regarding and event and the historical information associated with the computing device. The system may analyze a variety of data in making such a comparison. For example, the system may perform a text analytics algorithm to analyze the text of a data source to identify features of the text such as keywords, grammar, capitalization, numbers, and punctuation. The text analytics algorithm may also remove or ignore words that do not contain information relevant to predicting the future event associated with the computing device. Similarly, the system may assign different weights to different features identified in the event information and/or historical information based on the propensity of such a feature to predict the future event. For example, in analyzing the text of a computer hardware diagnostics log, the system may assign a relatively high weight to a measured temperature that is above a predetermined threshold, either based on the numeric measurement (e.g., "200 degrees") or by identifying a flag in the log indicating a high temperature (e.g., identifying the keywords "heat warning" in the log). By contrast, measurements in the log that are within normal parameters may be given relatively lower weights, or ignored altogether.

Figure 2B:
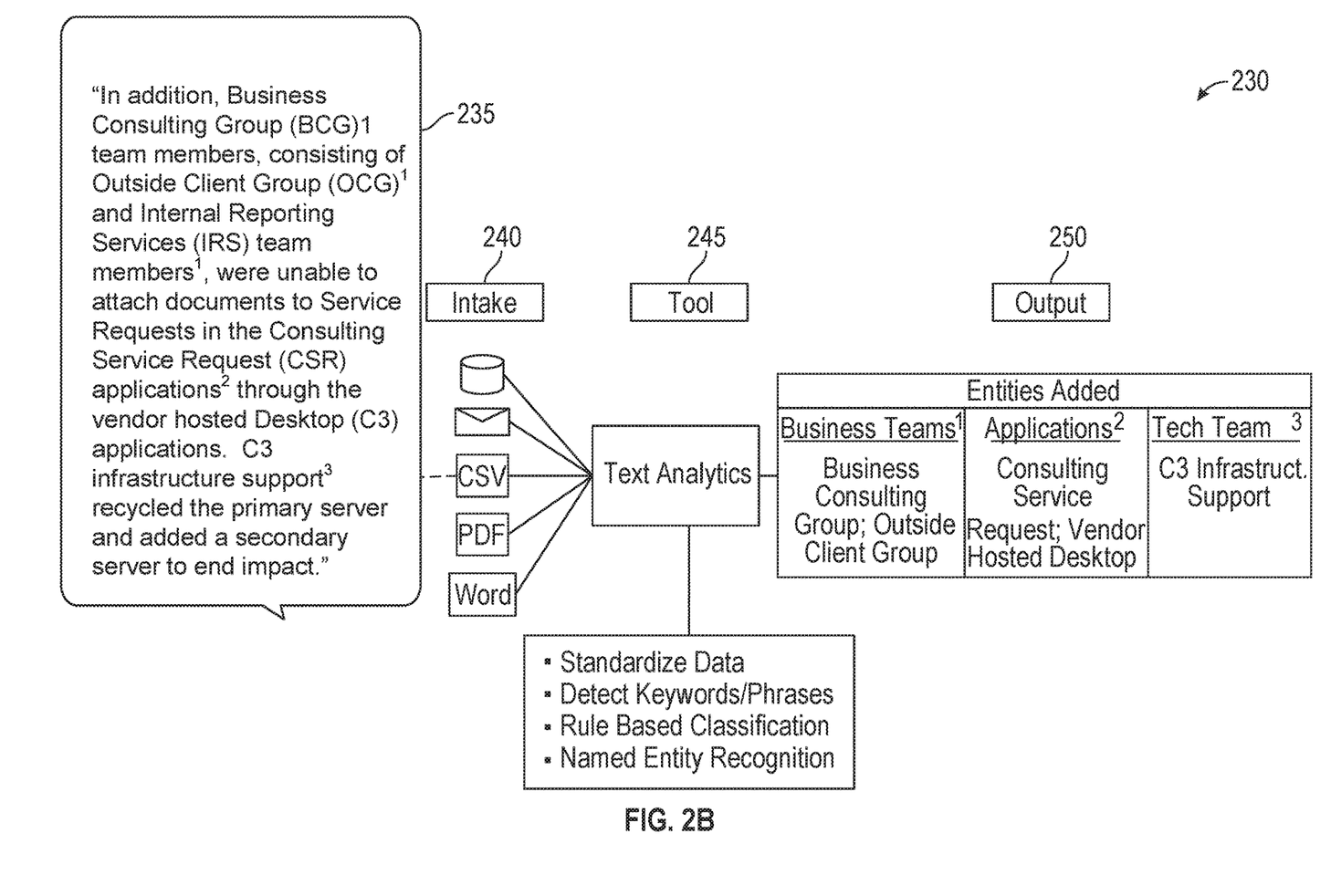
FIG. 2B is a diagram showing an example of a text analytics algorithm according to various aspects of the present disclosure.

FIG. 2B is a diagram showing an example of a text analytics algorithm according to various aspects of the present disclosure. In this example, block 235 depicts an excerpt of text from an input source 240. As shown (and noted above), the system may analyze input 240 from a variety of sources, including information from databases, emails, comma-separated value (CSV) files, as well as files in various formats (e.g., PDF and Word). The system may employ a variety of algorithms and tools 245 to analyze the input. In the example shown in FIG. 2B, the system employs a text analytics algorithm to analyze information from multiple input sources 240. Among other things, this algorithm standardizes the data from the different sources, detects keywords and phrases in the input, performs a rule-based classification of the input, and performs a named entity recognition.

In some embodiments, the system determines the likelihood of a future event by identifying, from the information regarding the current event, a plurality of entities associated with the computing device, as well as by identifying relationships between such entities. In some embodiments, such as the example shown in FIG. 2B, the system may identify entities associated with the computing device by performing a named entity recognition analysis on information regarding the event and/or the historical information associated with the computing device. The named entity recognition analysis may analyze and determine a variety of characteristics, such as a grammatical feature of a target word (e.g., whether the target word is a proper noun, verb, etc.), and a word shape feature of a target word (e.g., "Ul" to describe "Processor," where "U" stands for a sequence of upper-case letters and "1" stands for a sequence of lower-case letters).

In the example shown in FIG. 2B, the system identifies three entities as an output 250 from the input text 235. In this example, superscripts 1, 2, and 3 are included to flag from where the three entities, Business teams, Applications, and Responsible Tech Team (abbreviated "Tech Team" in FIG. 2B) are identified, though these numbers are included simply for purposes of demonstration—an actual text input would typically not include such flags. Any number of entities may be so identified by embodiments of the present disclosure. For example, a fourth group (not shown) may include a "Hardware" entity that includes the "primary server" and "secondary server" listed in input 235. Continuing the example, the system identifies two business teams from the text (the "Business Consulting Group" and the "Outside Consulting Group"). A third entity (not shown) that could be listed in this section is the "Internal Reporting Team." In these particular examples, the Named Entity Recognition (NER) process identifies these two entities based on an identification and classification of proper nouns in the text. In addition to the two teams identified above, proper nouns identified as entities in other examples may include people (e.g., "George Washington"), places (e.g., "St. Louis, Mo."), applications (e.g., identified by the name of a software application or a vendor associated with the application), and various technologies (e.g., servers, hardware components, etc.).

In some embodiments, the system builds a lexicon to capture all of the named entities in the unstructured text from an input source. The system may use various features of words to identify the named entities, such as word shape features (e.g., the way the word appears to the entity extractor), capitalization, numbers, punctuation, location, grammatical features (e.g., for providing word type and phrasing information), part of speech tagging, shallowing parsing, and context (e.g., features of words before and after the target word or phrase).

Using the identified entities (e.g., shown as outputs 250 in FIG. 2B, the system may identify relationships between the entities. For example, the system may identify relationships such as which business unit entity uses a particular technology entity (e.g. a software application). Subsequent to identifying the relationships, the system may analyze the relationship data in conjunction with the event data and historical data to identify and predict the occurrence of future events. In addition to identifying entities and their relationships, the system may analyze data such times and locations associated with events to help determine the likelihood of a future event.

The system may help identify a variety of future events affecting a computing device. For example, the system may identify future potential shortfalls in system capacity, a system outage, a hardware malfunction (e.g., a software patch failing to install), and communication errors (e.g., network congestion, connection failures, etc.). The system may report information on the likelihood a future issue via an electronic communication, such as by transmitting an email to an administrator of the system, displaying the information on a web-based interface, and the like.

In one particular example, the system may be used in conjunction with point of sale systems to analyze inputs such as sales information from each point of sale (POS) device in the system. In this example, each sale event at a POS device in the system transmits the sale data for that device to a central server, that analyzes the sales event information in conjunction with the sales events from the other POS devices. The sales event information may include information such as the amount of each purchase, the item purchased, and the time of the purchase. Additionally, the system may analyze diagnostic logs periodically received from each point of sale device. The current information from the POS devices may be compared to historical POS information, using the textual analytics process described above, to identify issues with the POS system such as a shortfall in POS systems to handle demand, as well as a failing POS device. For example, the system may identify the keywords "transaction error" in the sales information stored in the historical data, and determine that there is a 90% probability of the POS device failing completely or partially within an hour subsequent to issuing such an error. System administrators may then be alerted and can replace the device prior to experiencing a complete failure, thus pre-emptively addressing the failing device and avoiding a complete reduction in capacity if the device were to fail without such warning. In this manner, embodiments of the present disclosure can efficiently and accurately identify potential future events that can affect computing devices and their components.

In another particular example, the system may receive diagnostic logs from a server computing device, including periodic information on the different hardware and software components of the system, and information on the system's interaction with other devices (such as client devices in communication with the server). In this example, the system may analyze the input data (e.g., via textual analysis) to identify two particular entities: an operating system running on the server and a software update scheduled to be applied to the operating system in the future. The system may retrieve historical data associated with the software patch previously applied to other systems similar to the server computing device, and analyze change logs and error reports to identify potential issues arising from the patch. In one example, the system may identify a software error that is introduced by the patch and renders communication with a certain type of client computing device impossible. In this example, the system may assign a high probability of a similar effect occurring should the software patch be applied to the server computing device, assign a severity level to the potential event based on the number of such client devices that communicate with the server, and transmit an alert to an administrator of the system ahead of the application of the patch. In other embodiments, the system may automatically halt application of the patch and alert the human administrators, thus preventing potential harm to the system or its operation should the administrators be unable or unavailable to halt the patch on their own.

FIG. 3 is a block diagram illustrating exemplary components of a computing system 300 that may operate in conjunction with embodiments of the present disclosure. System 300 (in whole or in part) may be (or include) any of the computing devices 110, 120, 122, 130 shown in FIG. 1. In this example, system 300 reads instructions 324 from a machine-readable medium (e.g., a tangible, non-transitory, machine-readable storage medium) 322 to perform a variety of functions, including any of the processes (in whole or in part) described herein.

System 300 can be connected (e.g., networked) to other machines. In a networked deployment, the system 300 can operate in the capacity of a server machine or a client machine in a server-client network environment, as well as a peer machine in a peer-to-peer (or distributed) network environment. System 300 may be (or include) a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 324, sequentially or otherwise, that specify actions to be taken by that machine. While only a single machine is illustrated in FIG. 3, the term "machine" or "system" as used herein may also include any number of different devices, systems, and/or machines that individually or jointly execute the instructions 324 to perform any one or more of the methodologies discussed herein. Additionally, alternate systems operating in conjunction with the embodiments of the present disclosure may have some, all, or multiples of the components depicted in FIG. 3.

In the example shown in FIG. 3, system 300 includes processor 302. Any processor may be used in conjunction with the embodiments of the present disclosure, such as a central processing unit (CPU), a graphics processing unit (GPU), a digital signal processor (DSP), an application specific integrated circuit (ASIC), a radio-frequency integrated circuit (RFIC), or any suitable combination thereof. System 300 further includes a main memory 304 and a static memory 306, which are configured to communicate with each other via a bus 308.

The system 300 further includes a user interface that may include a variety of components, including one or more output devices such as a graphics display 310 (e.g., a plasma display panel (PDP), a light emitting diode (LED) display, a liquid crystal display (LCD), a projector, or a cathode ray tube (CRT)). The user interface of the system 300 may also include any number of input devices and other components, including an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 can also reside, completely or at least partially, within the main memory 304, within the processor 302 (e.g., within the processor's cache memory), or both, during execution thereof by the system 300. Accordingly, the main memory 304 and the processor 302 can be considered as machine-readable media. The instructions 324 can be transmitted or received over a network 326 via the network interface device 320.

As used herein, the term "memory" may refer to any machine-readable medium able to store data temporarily or permanently, including random-access memory (RAM), read-only memory (ROM), buffer memory, flash memory, and/or cache memory. While the machine-readable medium 322 is shown in this example as a single medium, the term "machine-readable medium" may include a single medium or multiple media (e.g., a centralized or distributed database, or associated caches and servers) able to store instructions 324. The term "machine-readable medium" may also include any medium, or combination of multiple media, that is capable of storing instructions (e.g., software) 324 for execution by a machine. Accordingly, a "machine-readable medium" refers to a single storage apparatus or device, as well as "cloud-based" storage systems or storage networks that include multiple storage apparatus or devices. The term "machine-readable medium" may also include one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system comprising:
a processor; and
memory coupled to the processor and storing instructions that, when executed by the processor, cause the processor to perform operations to:
receive information regarding a current event associated with a computing device;
retrieve historical information associated with the computing device;
apply a named entity recognition function to the historical information to identify related events, the related events sharing a similarity with the current event as determined by the named entity recognition function; and determine, based on a comparison of the information regarding the current event with the historical information, a likelihood of a future event associated with the computing device occurring, wherein determining the likelihood of the future event occurring includes:
  evaluating respective time and location of the related events;
  identifying, from the information regarding the current event, a plurality of entities associated with the computing device; and
  identifying relationships between the plurality of entities.

2. The system of claim 1, wherein the instructions to identify the plurality of entities includes instructions to perform a named entity recognition analysis to identify proper nouns in text of the information regarding the current event.

3. The system of claim 2, wherein the instructions to perform the named entity recognition analysis include instructions that cause the processor to perform operations to perform one or more of: identify a word shape feature of a target word, identify a grammatical feature of a target word, and identify a context of a target word.

4. The system of claim 1, wherein the determination of the likelihood of the future event occurring is further based on one or more of: a time associated with the current event, and a location associated with the current event.

5. The system of claim 1, wherein the determination of the likelihood of the future event occurring is further based on an event of the related events that includes one or more of: a system outage, a hardware malfunction, a software malfunction, and communication errors.

6. The system of claim 1, wherein the current event associated with the computing device is associated with one or more of: a hardware component of the computing device, and a software component of the computing device.

7. The system of claim 1, wherein the memory further stores instructions that cause the processor to perform operations to: transmit an electronic communication containing the likelihood of the future event associated with the computing device occurring.

8. A method comprising:
  receiving, by a computer system, information regarding a current event associated with a computing device;
  retrieving, by the computer system, historical information associated with the computing device;
  applying a named entity recognition function to the historical information to identify related events, the related events sharing a similarity with the current event as determined by the named entity recognition function; and
  determining, by the computer system based on a comparison of the information regarding the current event with the historical information, a likelihood of a future event associated with the computing device occurring, wherein determining the likelihood of the future event occurring includes:
  evaluating respective time and location of the related events,
  identifying, from the information regarding the current event, a plurality of entities associated with the computing device; and
  identifying relationships between the plurality of entities.

9. The method of claim 8, wherein identifying the plurality of entities includes performing a named entity recognition analysis to identify proper nouns in text of the information regarding the current event.

10. The method of claim 9, wherein performing the named entity recognition analysis includes one or more of: identifying a word shape feature of a target word, identifying a grammatical feature of a target word, and identifying a context of a target word.

11. The method of claim 8, wherein determining the likelihood of the future event occurring is further based on one or more of: a time associated with the current event, and a location associated with the current event.

12. The method of claim 8, wherein determining the likelihood of the future event occurring is further based on an event of the related events that includes one or more of: a system outage, a hardware malfunction, a software malfunction, and communication errors.

13. The method of claim 8, wherein the current event associated with the computing device is associated with one or more of: a hardware component of the computing device, and a software component of the computing device.

14. The method of claim 8, further comprising: transmitting an electronic communication containing the likelihood of the future event associated with the computing device occurring.

15. A non-transitory computer-readable medium storing instructions that, when executed by a computer system, cause the computer system to perform operations comprising:
  receiving information regarding a current event associated with a computing device;
  retrieving historical information associated with the computing device;
  applying a named entity recognition function to the historical information to identify related events, the related events sharing a similarity with the current event as determined by the named entity recognition function; and
  determining, based on a comparison of the information regarding the current event with the historical information, a likelihood of a future event associated with the computing device occurring, wherein determining the likelihood of the future event occurring includes:
  evaluating respective time and location of the related events,
  identifying, from the information regarding the current event, a plurality of entities associated with the computing device; and
  identifying relationships between the plurality of entities.

16. The computer-readable medium of claim 15, wherein identifying the plurality of entities includes performing a named entity recognition analysis to identify proper nouns in text of the information regarding the current event.

17. The computer-readable medium of claim 16, wherein performing the named entity recognition analysis includes one or more of: identifying a word shape feature of a target word, identifying a grammatical feature of a target word, and identifying a context of a target word.

18. The computer-readable medium of claim 15, wherein determining the likelihood of the future event occurring is further based on one or more of: a time associated with the current event, and a location associated with the current event.

19. The computer-readable medium of claim 15, wherein determining the likelihood of the future event occurring is further based on an event of the related events that includes one or more of: a system outage, a hardware malfunction, a software malfunction, and communication errors.

20. The computer-readable medium of claim 15, wherein the medium further stores instructions for causing the computer system to perform operations comprising: transmitting an electronic communication containing the likelihood of the future event associated with the computing device occurring.

* * * * *